(12) United States Patent
Hall

(10) Patent No.: US 12,190,362 B2
(45) Date of Patent: *Jan. 7, 2025

(54) DIGITAL NON-FIAT BASED SYSTEM FOR BARTERING

(71) Applicant: Sharon Hall, Laurel, MD (US)

(72) Inventor: Sharon Hall, Laurel, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,815

(22) Filed: Aug. 19, 2023

(65) Prior Publication Data

US 2024/0362691 A1    Oct. 31, 2024

Related U.S. Application Data

(63) Continuation of application No. 17/074,738, filed on Oct. 20, 2020, now Pat. No. 11,776,029.

(51) Int. Cl.

| | |
|---|---|
| *G06Q 30/00* | (2023.01) |
| *G06F 16/2457* | (2019.01) |
| *G06Q 30/02* | (2023.01) |
| *G06Q 30/0601* | (2023.01) |
| *G06Q 30/08* | (2012.01) |

(52) U.S. Cl.
CPC ... *G06Q 30/0611* (2013.01); *G06F 16/24578* (2019.01); *G06Q 30/0278* (2013.01); *G06Q 30/0609* (2013.01); *G06Q 30/08* (2013.01)

(58) Field of Classification Search
CPC ........................ G06Q 30/0609; G06Q 30/0611
See application file for complete search history.

(56) References Cited

U.S. PATENT DOCUMENTS

| 2002/0038278 A1* | 3/2002 | Himmelstein | G06Q 30/06 705/37 |
| 2008/0103986 A1* | 5/2008 | Bocheck | G06Q 30/06 705/80 |
| 2008/0313092 A1* | 12/2008 | Lanham | G06Q 30/08 705/80 |
| 2013/0024309 A1* | 1/2013 | Sandholm | G06Q 30/06 705/26.1 |
| 2014/0207557 A1* | 7/2014 | Choi | G06Q 30/0239 705/14.39 |
| 2016/0034989 A1* | 2/2016 | Kline | G06Q 50/01 705/26.2 |
| 2018/0204262 A1* | 7/2018 | Donkervoet | G06Q 30/0641 |
| 2019/0050935 A1* | 2/2019 | Rashwan | G06F 16/24578 |
| 2020/0211096 A1* | 7/2020 | Smeltzer | G06Q 40/04 |

OTHER PUBLICATIONS

Malitz, Phyllis. "The business of Barter." Journal of Accountancy 185.3 (1998): 72.*

* cited by examiner

*Primary Examiner* — Kathleen Palavecino
(74) *Attorney, Agent, or Firm* — Kimberly McLean, Esq.; Fishman Stewart, PLLC

(57) ABSTRACT

The invention is a non-fiat-based system for bartering. More particularly, the system provides a number of ways to trade goods and services across a digital platform without the need or use of money and when necessary valuates the goods and services to provide exact to approximate exchanges in value. More particularly, a barter ranking engine for non-fiat based transactions is provided that takes the guess work out of each bartering transaction created by the invention.

18 Claims, 1 Drawing Sheet

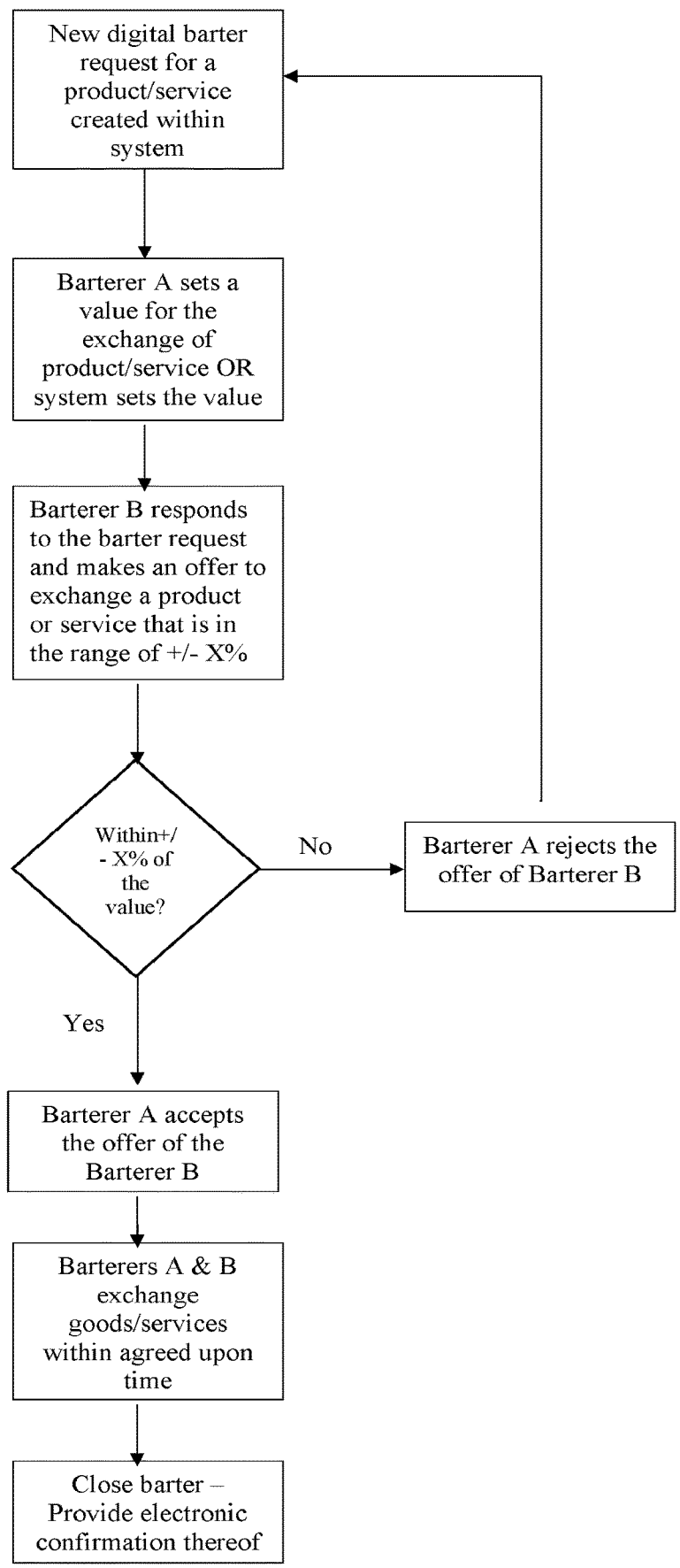

DIGITAL NON-FIAT BASED SYSTEM FOR BARTERING

CROSS REFERENCE TO RELATED APPLICATIONS

This application is a continuation of non-provisional U.S. patent application Ser. No. 17/074,738 filed Oct. 20, 2020, entitled DIGITAL NON-FIAT BASED SYSTEM FOR BARTERING. The entire contents of the above applications are incorporated herein in their entireties by this reference.

FIELD OF THE INVENTION

The invention is a non-fiat-based system for bartering. More particularly, the system provides a number of ways to trade goods and services across a digital platform without the need or use of money and when necessary valuates the goods and services to provide exact to approximate exchanges in value.

BACKGROUND OF THE INVENTION

Bartering goods and services long predates the invention of money. Ancient cultures, for millennia, recognized the exchange of goods for goods, goods for services and services for services. The advent of money later enabled money-based valuation of such goods and services, but bartering has remained a viable use of exchange right into modern times.

The internet enables the exchange of both goods and services using fiat or money. Purchased goods and services through sites like AMAZON®, EBAY®, ETSY® and any of a number of big box stores like TARGET®, WALMART® and THE KROGER CO.® is well known. What is much less known are the use of the Internet or apps loaded onto personal devices to match and then exchange, strictly through bartering, goods for goods, goods for services and services for services.

What is not well known and what the invention herein provides is a system for non-fiat-based bartering of goods and/or services that is substantially or fully free from geographic boundaries. This bartering happens in real time. Further, the system provides multiple ways to valuate goods and/or services so that barterers know, in the fiat of their choice, the value of the exchange being offered.

These embodiments and several more are the subject of the invention herein and will be discussed and revealed at length.

SUMMARY OF THE INVENTION

Accordingly, the invention provides a system for non-fiat-based bartering. It comprises a digitally based world-wide community, a first offer to provide a commodity by a first user to the digitally based world-wide community, a second offer to provide a commodity by a second user to the digitally based world-wide community, and an offer valuation engine installed within the digitally based world-wide community, the offer valuation engine being used to assign a value to the first offer and said second offer.

The system herein further comprises a barter matching engine installed within the digitally based world-wide community. The barter matching engine matches the first offer to the second offer based upon approximately equivalent value. Also included is a barter ranking engine installed within the digitally based world-wide community wherein the system for non-fiat-based bartering connects the first offer with the second offer so long as the barter matching engine at least approximately equates the value of the first offer to the value of the second offer.

In one execution of the invention herein, the commodities of the system for non-fiat-based bartering of the first offer and the second offer are services. In another execution hereof, the first and second offers are products. In another embodiment herein, the first offer is a service, the second offer is a product.

In an executing embodiment herein, the offer valuation engine of the non-fiat-based bartering system herein assigns a fiat-based value to the commodity of the first offer and the second offer. Herein, the offer valuation engine assigns a fiat-based value to the commodity of the first offer and the second offer in the local currency of the first offer and said second offer. Further, offer valuation engine preferably provides real-time currency exchange value between the commodities of the first offer and said second offer when each first and second offers originate in different currency locales.

In practice, the offer barter matching engine searches the digitally based world-wide community for approximately equivalent first and second offers. In alternative practice herein, the offer barter matching engine searches the digitally based world-wide community for at least one more offered commodity to make the first and second offer equivalent.

In another instance herein, the system for non-fiat-based bartering combines three or more offers to complete a transaction. The system may also combine five or more offers to complete a transaction. In another instance herein, the system may combine seven or more offers to complete a transaction.

The system of non-fiat-based bartering herein may further comprise a user ranking engine. In practice, a participating user of the system is assigned a ranking based upon product and/or service reliability. Each user may also be assigned a ranking based upon service and/or service quality. The ranking of the user for reliability is used by the offer valuation engine. The ranking of the user for quality is used by the offer valuation engine.

Operationally, the offer valuation engine permits the combination of the first offer and the second offer in one transaction comprises a variance of no more than ten percent. In another instance herein, the combination of the first and second offers in one transaction comprise a variance of no more than five percent. All such offers made herein may be recorded and executed by a block chain system.

BRIEF DESCRIPTION OF THE FIGURES

The various exemplary embodiments of the present invention, which will become more apparent as the description proceeds, are described in the following detailed description in conjunction with the accompanying drawings, in which:

FIG. 1 is a flow diagram showing flow of the bartering system herein.

DETAILED DESCRIPTION OF THE INVENTION

The invention herein provides a system for non-fiat-based bartering. It comprises a digitally based world-wide community, a first offer to provide a commodity by a first user to the digitally based world-wide community, a second offer to provide a commodity by a second user to the digitally based world-wide community, and an offer valuation engine installed within the digitally based world-wide community, the offer valuation engine being used to assign a value to the first offer and said second offer.

The system herein further comprises a barter matching engine installed within the digitally based world-wide community. The barter matching engine matches the first offer to the second offer based upon approximately equivalent value. Also included is a barter ranking engine installed within the digitally based world-wide community wherein the system for non-fiat-based bartering connects the first offer with the second offer so long as the barter matching engine at least approximately equates the value of the first offer to the value of the second offer.

In one execution of the invention herein, the commodities of the system for non-fiat-based bartering of the first offer and the second offer are services. In another execution hereof, the first and second offers are products. In another embodiment herein, the first offer is a service, the second offer is a product.

In an executing embodiment herein, the offer valuation engine of the non-fiat-based bartering system herein assigns a fiat-based value to the commodity of the first offer and the second offer. Herein, the offer valuation engine assigns a fiat-based value to the commodity of the first offer and the second offer in the local currency of the first offer and said second offer. Further, offer valuation engine preferably provides real-time currency exchange value between the commodities of the first offer and said second offer when each first and second offers originate in different currency locales.

In practice, the offer barter matching engine searches the digitally based world-wide community for approximately equivalent first and second offers. In alternative practice herein, the offer barter matching engine searches the digitally based world-wide community for at least one more offered commodity to make the first and second offer equivalent.

In another instance herein, the system for non-fiat-based bartering combines three or more offers to complete a transaction. The system may also combine five or more offers to complete a transaction. In another instance herein, the system may combine seven or more offers to complete a transaction.

The system of non-fiat-based bartering herein may further comprise a user ranking engine. In practice, a participating user of the system is assigned a ranking based upon product and/or service reliability. Each user may also be assigned a ranking based upon service and/or service quality. The ranking of the user for reliability is used by the offer valuation engine. The ranking of the user for quality is used by the offer valuation engine.

Operationally, the offer valuation engine permits the combination of the first offer and the second offer in one transaction comprises a variance of no more than ten percent. In another instance herein, the combination of the first and second offers in one transaction comprise a variance of no more than five percent. All such offers made herein may be recorded and executed by a block chain system.

Additionally, the system of non-fiat-based is on target to develop and implement a proprietary global Blockchain (decentralized database), developed in Java, Python and C++ programming languages that will support the recording of all of the barter transactions performed and share them with a public distributed network. All bartering records will be added to a block, containing a unique hash ID. The block will also contain the hash ID of the previous block in the chain.

Given the instability of international money systems, the blockchain based system of non-fiat-based bartering will serve as a store of value and a medium of exchange for goods and services worldwide. For example, if the United States relies on Mexico for bananas and Mexico relies on the United States for automobiles, the two countries could exchange a certain number of bananas for a certain number of automobiles that meet the set value criteria. Another example is of a triangulated trade, such that if there is a breakdown in trade between two countries, e.g., Country A exchanges with Country B for a goods/service that Country C needs. Country A then exchanges with Country C to get the goods/service that it needs.

FIG. 1 is a flow diagram showing flow of the bartering system herein. The first step of the system requires that Barterer A creates a new digital barter request for a product and/or service. Notably, Barterer A can offer both a product and service together, i.e., bundling, and/or provide multiple products or multiple serves at once. Next, Barterer A then sets a value for the exchange of a product(s) and/or service(s). Alternatively, as pointed out hereinabove, the system sets the value of the product(s) and/or service(s). Once the offer is rendered by Barterer A, Barterer B may respond to the barter request and accepts the tendered offer by offering a commensurate product(s) and/or service(s) in reply.

Once at least two offers are matched, not necessarily actually exchanged, the system evaluates how equal each offer is to one-another. The evaluation occurs based upon whether a user or system chosen percentage of the value between the offers of Barterer A and Barterer B. For example, either Barterer A or B or the system for bartering can set a percentage of difference in offer value. Herein, the percentage of difference can range from about one percent (1%) to about twenty percent (20%). Whatever X percentage is set, if it is met, then the system accepts the offers of Barterer A and Barterer B. If it is not met, the system can either reject both offers and cause Barterer A to start again or itself manipulate one or both offers to achieve the acceptable X percentage of value.

If the system is programmed to manipulate one or both of the offers, it can provide suggestions to either Barterer A and/or Barterer B to provide either more service and/or more product to either raise or lower the value of either service and/or product. The system can also be programmed to only match offers that are at least roughly equivalent within a pre-described percentage of value as described hereinabove.

Once both offers are accepted by Barterer A and Barterer B and evaluated by the system, Barterer A and Barterer B are then released to exchange their goods and/or services within a prescribed time. Such exchange of goods and/or services can be done within the system itself or alternatively outside of the system. In practice, Barterers A and B provide confirmation to the system once all exchanges have been fully met. The confirmations can be recorded, preferably, in block chain format.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for bartering, comprising:

a digitally based world-wide community including a blockchain platform;

a first offer to provide a commodity by a first user to said digitally based world-wide community, wherein the first user sets a selectable percentage of difference in an offer value for matching with another offer;

a second offer to provide a commodity by a second user to said digitally based world-wide community, wherein the second user sets a selectable percentage of difference in an offer value for matching with another offer;

an offer valuation engine installed within said digitally based world-wide community, said offer valuation engine assigning a value to said first offer and said second offer, wherein said offer valuation engine combines at least one more offered commodity to the first and second offer to complete a transaction; and wherein said offer valuation engine provides real-time currency exchange value between said commodities of said first offer and said second offer using the blockchain platform when each said first offer and said second offer originate in different currency locales;

a barter matching engine installed within said digitally based world-wide community, said barter matching engine matching said first offer to said second offer based upon approximately equivalent value, wherein the barter matching engine searches the digitally based world-wide community for the at least one more offered commodity to make the first and second offer equivalent; and a barter ranking engine installed within said digitally based world-wide community, said barter ranking engine connecting said first offer with said second offer on the blockchain platform so long as said barter matching engine matches said first offer to said second offer;

wherein the approximately equivalent value is based upon the selectable percentage of difference in offer value set by the first user or the second user;

wherein the system evaluates the matched offers based upon the user selectable percentage of difference in offer value and if the user selectable percentage is not met, the system can reject both offers or manipulate the first or second offer to achieve an acceptable percentage in difference in offer value;

wherein the system manipulates the first offer or the second offer to achieve the user selectable percentage of difference in offer value by recommending that either the first or second user provide either more services and/or product to either raise or lower the value of either service or product in their respective first or second offer; and wherein the blockchain platform provides a medium of exchange between the first user and second user.

2. The system of claim 1 wherein said commodity of said first offer and said second offer are services.

3. The system of claim 2 wherein said commodity of said first offer and second offer are products.

4. The system of claim 1 wherein said commodity of said first offer is a service and said commodity of said second offer is a product.

5. The system of claim 1 wherein said offer valuation engine assigns a fiat-based value to said commodity of said first offer and said second offer.

6. The system of claim 5 wherein said offer valuation engine assigns a fiat-based value to said commodity of said first offer and said second offer in the local currency of said first offer and said second offer.

7. The system of claim 1 wherein said offer barter matching engine searches said digitally based world-wide community for approximately equivalent said first offers and said second offers.

8. The system of claim 1 wherein said system combines three or more offers to complete a transaction.

9. The system of claim 8 wherein said system combines five or more offers to complete a transaction.

10. The system of claim 9 wherein said system combines seven or more offers to complete a transaction.

11. The system of claim 1 further comprising a user ranking engine.

12. The system of claim 11 wherein each said participating user is assigned a ranking based upon product and/or service reliability.

13. The system of claim 11 wherein each said participating user is assigned a ranking based upon service and/or service quality.

14. The system of claim 11 wherein said ranking of said user for reliability is used by said offer valuation engine.

15. The system of claim 11 wherein said ranking of said user for quality is used by said offer valuation engine.

16. The system of claim 1 wherein said offer valuation engine permits the combination of said first offer and said second offer in one transaction that comprises a variance of no more than ten percent.

17. The system of claim 16 wherein said offer valuation engine permits the combination of said first offer and said second offer in one transaction that comprises a variance of no more than five percent.

18. The system of claim 1 wherein said first offer and said second offer are recorded by an offer block chain system.

* * * * *